United States Patent [19]

Fukao et al.

[11] Patent Number: 5,936,370
[45] Date of Patent: Aug. 10, 1999

[54] ELECTROMAGNECTIC ROTATING MACHINE

[75] Inventors: Tadashi Fukao, Yokohama; Akira Chiba; Chikara Michioka, both of Tokyo, all of Japan

[73] Assignees: Ebara Corporation, Nikkiso Co., Ltd.; Seiko Seiki Co., Ltd., both of Japan

[21] Appl. No.: 08/635,031

[22] Filed: Apr. 19, 1996

[30] Foreign Application Priority Data

Apr. 21, 1995 [JP] Japan ..................................... 7-120497

[51] Int. Cl.⁶ ....................................................... G05B 1/06
[52] U.S. Cl. ........................ 318/652; 318/439; 318/254; 318/138; 318/560
[58] Field of Search ..................................... 318/439, 254, 318/138, 560, 700, 704, 721, 724, 727, 738, 799, 823; 310/90.5, 184, 198, 112

[56] References Cited

U.S. PATENT DOCUMENTS

| | | | |
|---|---|---|---|
| 4,743,815 | 5/1988 | Gee et al. ................................ | 318/254 |
| 5,023,527 | 6/1991 | Erdman et al. ......................... | 318/254 |
| 5,659,231 | 8/1997 | Svarovsky et al. ..................... | 318/368 |

FOREIGN PATENT DOCUMENTS

| | | |
|---|---|---|
| 2239038 | 2/1975 | Germany . |
| 2457084 | 6/1976 | Germany . |
| 2537597 | 3/1977 | Germany . |
| 2656469 | 6/1978 | Germany . |
| 91121833 | 3/1992 | Germany . |
| 1500809 | 2/1978 | United Kingdom . |

OTHER PUBLICATIONS

Proceedings of the International Symposium on Magnetic Bearings, Jul. 29, 1992, Y. Okada et al., pp. 176–183, "Sensorless Magnetic Levitation Control by Measuring the PWM Carrier Frequency Component".

IEEE Transactions on Energy Conversion, vol. 9, No. 1, Mar. 1, 1994, pp. 61–68, A. Chiba et al., "An Analysis of Bearingless AC Motors".

*Primary Examiner*—William M. Shoop, Jr.
*Assistant Examiner*—Kim Lockett
*Attorney, Agent, or Firm*—Adams & Wilks

[57] ABSTRACT

An electromagnetic rotating machine driven by an electromagnetic action between a stator and a rotor has drive windings fitted to the stator for generating a rotating magnetic field for rotatably driving the rotor, position control windings fitted to the stator for generating a magnetic field having a different number of poles than that of the drive windings, a magnetic force generation circuit for generating a magnetic force to act on the rotor by supplying the position control windings with an electric current effective to unbalance the magnetic field on the stator side, a circuit for detecting an induced voltage or current generated in the one or more position control windings in response to radial displacement of the rotor and the rotating magnetic field generated by the drive windings, a circuit for detecting radial displacement of the rotor based on the induced voltage or current and the magnitude and speed of the rotating magnetic field, and a position control circuit for controlling the radial position of the rotor by changing the magnetic force generated by the magnetic force generation circuit in accordance with the detected radial displacement of the rotor.

21 Claims, 8 Drawing Sheets

COORDINATE SYSTEM

ROTOR AND STATOR CENTERS

ELECTROMAGNECTIC ROTATING MACHINE

FIELD AND BACKGROUND OF THE INVENTION

The present invention relates to an electromagnetic rotating machine, and particularly to an electromagnetic rotating machine such as induction machines, synchronous machines, the stator of which has radial position control windings for the magnetic bearing function.

In recent years, it has been demanded that the motor speed and output be increasingly high for machine tools, turbomolecular pumps, fly-wheels, etc. The bearings for these apparatuses are magnetic bearings, which are adaptable for high speed rotation and need no maintenance for a long time.

Such a magnetic bearing tends to be large in size to generate sufficient force, and may have a length equal to the axial length of a motor. As a result, the main shaft of the motor becomes long, so that it elastically vibrates when it rotates at high speed. It is therefore not easy to achieve high speed rotation. In addition, in order to achieve high motor power, a motor needs a longer shaft. This increases the attraction force generated by the electromagnetic machine, so that there is a need to enlarge the size of the magnetic bearings as well.

As a result, the critical speed becomes low, so that it is very difficult to make the motor speed higher.

In view of such problems, in recent years, electromagnetic rotating machines with position control windings have been developed, in which position control windings for the magnetic bearings are added to the stators of the motors, so that the shaft length is short and the speed and output are high.

FIG. 7 of the accompanying drawings shows an electromagnetic rotating machine 30 having position control windings. The machine 30 includes a rotor 31, stators 32 and 84, and three-phase inverters 20, 36 and 38.

The stators 32 and 34 of the motor have windings (not shown) for generating torque, which are connected with the inverter 20. The stators also have radial position control windings (not shown) for generating radial magnetic force for the rotor 31. The inverters 36 and 38 control the currents of the radial position control windings of the stators 32 and 34, respectively, to regulate radial positions of the rotor shaft 31. The electromagnetic rotating machine 30 has position control windings which can generate both torque and radial force with one stator. The machine 30 can be short in axial length compared with conventional high speed motors with magnetic bearings. If the axial shaft length is the same as the conventional machine the speed and output of the motor 30 can be high.

Electromagnetic rotating machines with position control windings have already suggested can be reviewed as follows.

In some disc type motors, axial force is generated by varying the exciting magnetic fluxes, so that the axial position of each rotor is adjusted. This can be applied to disc type rotating machines, but this is difficult to apply to radial rotating machines widely used.

In some general induction motors, the windings can be split and currents applied thereto are unbalanced to generate radial force for radial position control. When the rotor is positioned centrally, however, it is theoretically not possible to generate radial force.

Japanese Patent First (before exam.) Publication S.64-55, 031 discloses magnetic paths simply common to magnetic bearings and a stepping motor. This method is suitable for low speed actuators, but is not suitable structurally for very high speed rotation since it is necessary to make the number of poles very high. It is difficult to apply this method to rotating machines having sinusoidal magnetomotive force distribution and/or magnetic flux distribution, which are widely used for high output induction machines, permanent magnet type motors, etc.

Japanese Patent First Publication H.4-2386,188 discloses art in which the number of poles is reduced, and suggests structure similar to conventional induction machines and permanent magnet type rotating machines. In this art, the stator is similar to the stator core of a four-pole switched reluctance machine. The stator has eight teeth with four-pole concentrated windings, which are divided with the magnetic poles so that the magnetic flux of each pole is independently controlled. It is possible to generate a rotating magnetic field by varying the magnitude of the flux of each pole. It is also possible to generate radial force as in conventional magnetic bearings.

Japanese Patent First Publication H.4-107,318 discloses similar core structure, which is characterized by distributed windings for magnetomotive force distribution close to sinusoidal distribution.

In the art of the last two publications, the windings are divided into four and are independently driven. If the windings are two-phase, there is a need for at least eight single-phase inverters and 16 wires in one unit for generating radial forces in two orthogonal axes as well as torque. In addition, the radial forces and the torque are controlled with the same winding current, so that there is a need for a current driver of very high speed, high precision and large capacity.

Japanese Patent First Publication H.2-193,547 discloses a four-pole electromagnetic rotating machine, which is provided with two-pole windings to generate radial force. This machine may be a rotating-field type motor, in which, by adding position control windings each having a different number of poles to the stator, the rotating magnetic field is positively unbalanced to generate radial force together with torque.

FIG. 8 shows the principle of generation of radial force in an electromagnetic rotating machine of this type. The machine includes a rotor 40 and a stator 42, which has four-pole windings 44 for generating torque.

If the rotor 40 is positioned coaxially with the stator 42, the windings 44 generate four-pole symmetrical magnetic fluxes H4 by being supplied with positive current. A four-pole rotating magnetic field is generated by supplying two-phase alternating currents to the four-pole windings 44 and the other four-pole windings (not shown) perpendicular to them. As disclosed in Japanese Patent First Publication H.2-193,547, the windings may otherwise be three-phase. Thereby, if the rotor 40 has a cage winding, torque is generated in the rotor as the rotor of an ordinary induction machine.

The stator 42 also has two-pole position control windings 46a and 46b, in addition to the four-pole windings 44. The windings 46a and 46b make magnetic force act radially on the rotor 40. When the winding 46a is supplied with positive current, two-pole magnetic fluxes H2 are generated as shown in FIG. 8.

In this case, at the air-gap under the rotor 40 (in FIG. 8), the direction of the four-pole fluxes H4 is opposite to that of the two-pole fluxes H2, so that the flux density decreases. On the other hand, at the air-gap over the rotor 40, the directions of the fluxes H4 and H2 coincide, the flux density increases.

The flux distribution is thus unbalanced, which causes a radial force F in the rotor 40, which acts upward in FIG. 8 so as to levitate the rotor within the stators. The force F can be adjusted by controlling the magnitude of the current flowing in the two-pole winding 46a. The direction of the force F can be reversed by reversing the direction of the current in the winding 46a.

It is possible to generate radial force in the right or left direction in FIG. 8 by supplying current to the two-pole winding 46b, which is perpendicular to the winding 46a. By adjusting the magnitude and directions of the currents in the two-pole windings 46a and 46b, it is possible to generate a radial force in the desired magnitude and direction.

In FIG. 8, the four-pole windings 44 are used to drive the motor, while the two-pole windings 46a and 46b are used for radial position control. Otherwise, the four-pole windings 44 may be used to generate radial force, while the two-pole windings 46a and 46b may be used to drive the motor.

In an electromagnetic rotating machine which provides control of the rotor in accordance with a principle as stated above, and which has three-phase windings, it is possible to generate radial force and torque with only six wires and two three-phase inverters. Because the windings for generating radial force are separate from those for generating torque, it is possible to use an inverter or a power amplifier of small power capacity for radial force control. Because the four-pole and two-pole windings are used, the mutual couplings are zero if the rotor is positioned centrally, and no induced voltage of the motor is generated in the radial force control windings. Such electromagnetic rotating machines can be widely used as high output rotating machines such as induction machines, permanent magnet type synchronous machines, synchronous reluctance motors, and etc., in which sine-wave magnetomotive force distribution and/or sine-wave magnetic flux distribution are/is estimated.

FIG. 9 shows the control system of an electromagnetic rotating machine with position control windings. To simplify the setup, FIG. 9 shows only the system setup for two-pole radial position control.

The control system shown in FIG. 9 consists essentially of a motor drive (circuitry) section A for applying torque to the rotor 50, and a position control (circuitry) section B for controlling the radial position of the rotor 50.

In the motor drive section A, the sine-wave oscillator 52 and cosine-wave oscillator 53 generate sine and cosine waves, respectively, based on the primary current frequency command $2\omega$. The waves are multiplied by a current amplitude command value. The amplitude and phase of the current as well as the frequency are determined by motor drive controller (not shown) depending on motor/generator types. In the case of induction motors, field oriented controllers can be used. Vector controllers can be used in other types of electric machines. Simple v/f controllers can be used in accordance with loop gain adjustment of radial position control loops together with main flux amplitide and rotational position estimater.

The two-phase/three-phase converter 54 makes two-phase/three-phase conversion and outputs instantaneous current command values iu4, iv4 and iw4. In accordance with these values, the inverter 56 controls the currents of the four-pole motor windings C4.

The air-gap lengths of the rotor 50 are detected by displacement sensors 58a and 58b.

In the position control section B, the adders 60a and 60b compare the outputs $\alpha$ and $\beta$ from the displacement sensors 58a and 58b with gap command values $\alpha 0$ and $\beta 0$, respectively. The errors $\epsilon\alpha$ and $\epsilon\beta$ are supplied to the controllers such as PID (proportional integration/differentiation) 62a and 62b, respectively. The controllers 62a and 62b generate command values F$\alpha$ and F$\beta$, respectively, which command the radial forces in accordance with the air-gap errors $\epsilon\alpha$ and $\epsilon\beta$. The modulator 64 modulates the command values F$\alpha$ and F$\beta$ on the basis of the signals from the sine-wave oscillator 52 and cosine-wave oscillator 53, respectively, in accordance with the angle of the rotating magnetic field, which may vary depending on load conditions, and generates current command values i$\alpha$ and i$\beta$ for the two-pole position control windings N$\alpha$ and N$\beta$. If the rotor has windings of squirrel cage type, a compensator 66 is provided for phase compensation, as shown in FIG. 9. The two-phase/three-phase converter 68 converts the output signals of the compensator 66 in two-phase axes into values in three-phase axes. In accordance with the current command values iu2, iv2 and iw2 from the converter 68, the inverter 70 regulates the winding currents Iu2, Iv2 and Iw2 of the two-pole position control windings N$\alpha$ and N$\beta$.

In the motor drive section A, the manner in which to generate frequency command values and current amplitude command values depends on the type of motors and control methods such as vector control, slip frequency control, and v/f control as well as constant id control. For vector control etc., the motor drive section A supplies the position control section B with the amplitude and angle of the field and etc., which are omitted from FIG. 9, in addition to the sine and cosine waves of the frequency. These commands can be generated based on detected shaft speeds, rotational angles and motor currents.

As described above, the control system shown in FIG. 9 is very similar to the control systems of the conventional magnetic bearings, except for modulation in synchronism with the rotating magnetic field.

The conventional electromagnetic rotating machines with position control windings, however, have problems with the displacement sensors for detecting the displacements of their respective rotors. Specifically, since the displacement sensors are not necessarily mounted where radial force is generated, elastically deformable rotors may cause instability. In addition, eccentricity and roughness of the sensor target surface, etc. may cause disturbance of the position control systems. It is another problem that displacement sensors themselves are expensive.

In order to solve the above problems with displacement sensors, it is contemplated that a magnetic bearing is made sensorless by the following methods.

One of the methods is to estimate the radial position variation of the main shaft from the switching frequency of a current controller for driving a magnetic bearing, because the switching frequency changes with the inductance input from the magnetic bearing terminals. This method is resistant to noise and practical. In this method, however, even if the rotor is displaced, the inductance of the magnetic bearing is not very largely changed. In particular, the inductance variation is very small near the center if differential windings are employed. The control is therefore difficult.

In another of the methods, the relation between the voltage and current of a magnetic bearing is a function of the distance between the bearing and the associated main shaft, linearization is made near the operating point, and radial displacement is estimated with an observation apparatus or a simulator, or a controller is set up for stabilizing the whole system from the detected current to generate a voltage command value. This method is mathematically very clear, and new. It is, however, necessary to make linearization near the operating point. It is also very difficult to adjust parameters to set up a stabilizing controller.

OBJECT AND SUMMARY OF THE INVENTION

It is an object of the present invention to provide a cost-effective and reliable electromagnetic rotating machine in which rotor displacement can be estimated without providing displacement sensors, without position estimation by linearization near the operating point, as implemented in the above-mentioned magnetic bearing, or position estimation from the amount of inductance variation in the electromagnet for the magnetic bearing, and in which stable position control can be achieved.

In an electromagnetic rotating machine arranged in accordance with one aspect of the invention, magnetic force generation means generates a magnetic force acting on a rotor by supplying position control windings with electric current to unbalance the magnetic field on the stator side so as to levitate the rotor within the stator by means of a magnetic field having poles which differ in number from those of drive windings. Induced state detection means detects the induced voltage or the induced current generated in the position control windings by displacement of the rotor and the rotating magnetic field generated by the drive windings. Displacement detection means detects the displacement of the rotor from the induced voltage or the induced current detected by the induced state detection means and the magnitude and speed of the rotating magnetic field generated by the drive windings. Position control means controls the position of the rotor by changing the magnetic force generated by the magnetic force generation means in accordance with the displacement detected by the displacement detection means.

In an electromagnetic rotating machine arranged in accordance with another aspect of the invention, magnetic force generation means generates a magnetic force acting on a rotor by supplying position control windings with electric current to unbalance magnetic field on the stator side so as to levitate the rotor within the stator by means of a magnetic field having poles which differ in number from those of drive windings. Electromotive force generation means generates voltage or current which cancels an induced voltage or induced current generated in the position control windings by displacement of the rotor and the rotating magnetic field generated by the drive windings. Position control means controls the position of the rotor by changing the magnetic force generated by the magnetic force generation means in accordance with the voltage or current generated by the electromotive force generation means.

In an electromagnetic rotating machine arranged in accordance with a further aspect of the invention, magnetic force generation means generates a magnetic force acting on a rotor by supplying position control windings with electric current to unbalance the magnetic field on the stator side so as to levitate the rotor within the stator by means of a magnetic field having poles which differ in number from those of drive windings. An impedance circuit determines the relation between the induced voltage and the current which are generated in the position control windings by displacement of the rotor and the rotating magnetic field generated by the drive windings. Position control means controls the position of the rotor by changing the magnetic force generated by the magnetic force generation means in accordance with the relation between the voltage and current, which is determined by the impedance circuit.

BRIEF DESCRIPTION OF THE DRAWINGS

Preferred embodiments of the present invention are described below in detail with reference to the accompanying drawings. The invention should not be limited to the drawings exclusively for explanation. In the drawings.

DETAILED DESCRIPTION OF THE EMBODIMENTS

Figure 1:
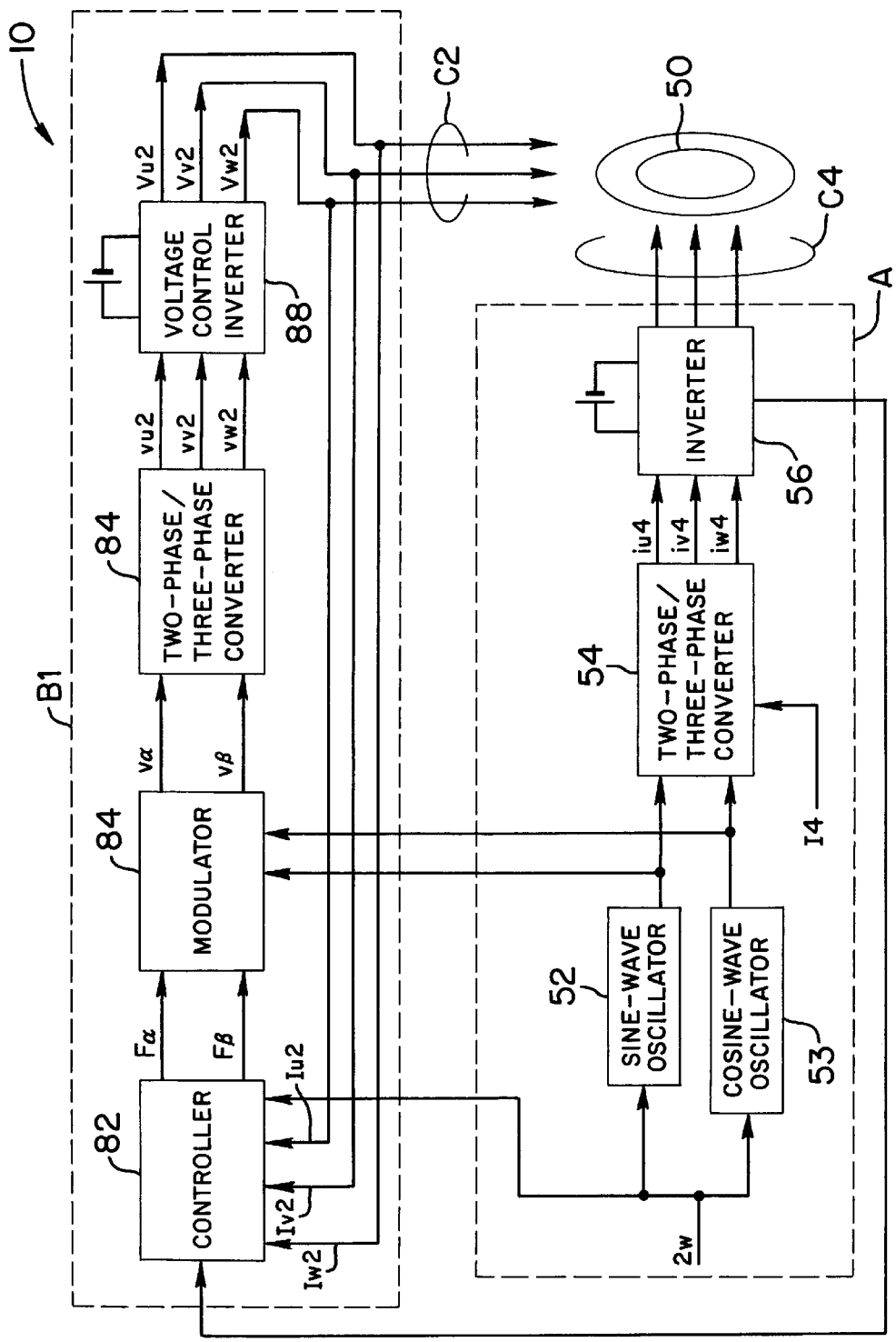
FIG. 1 is a block diagram showing the main portion of the control system of an electromagnetic rotating machine according to the first embodiment.
Figure 9:
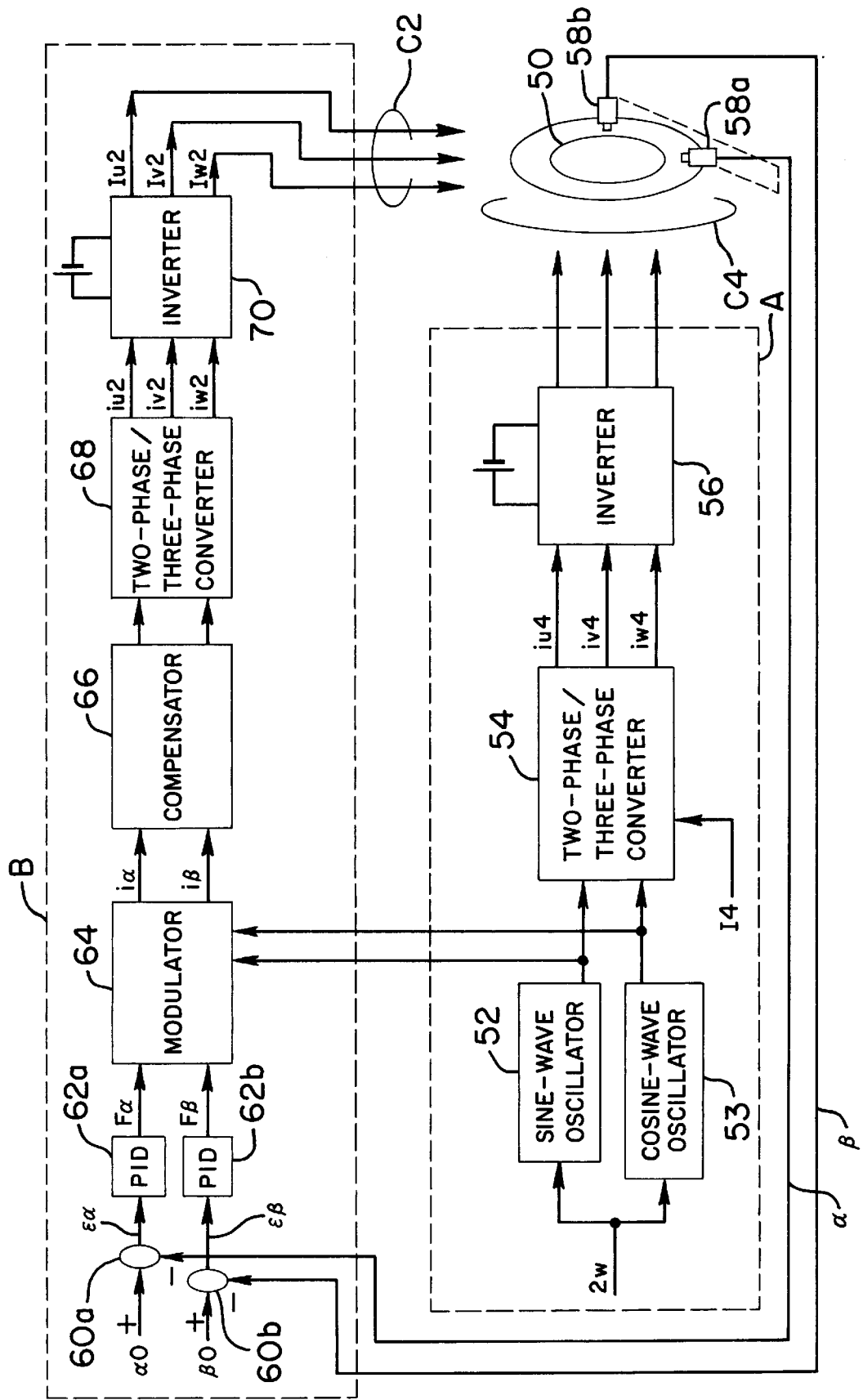
FIG. 9 is a block diagram showing the control system of the conventional electromagnetic rotating machine.

FIG. 1 schematically shows the main part in the control system of the electromagnetic rotating machine 10. In FIG. 1, setups and/or parts which are similar to those of the conventional machine shown in FIG. 9 are indicated by the same numerals, and are not described in detail.

In this embodiment, the electromagnetic rotating machine 10 may be an induction motor, a synchronous motor or the like, which can generate a rotating magnetic field at its stator to apply torque to its rotor 50. The stator has motor windings C4 for generating a rotating magnetic field, and position control windings C2 for unbalancing this rotating field to produce a radial magnetic force to act on the rotor 50 and to levitate the rotor within the stator. The principle of generation of radial force by the windings C2 is similar to that shown in FIG. 8.

The electromagnetic rotating machine 10 includes a position control (circuitry) section B1 for controlling the currents of the position control windings C2. In the section B1, instead of providing a displacement sensor, the controller 82 is supplied with the currents Iu2, Iv2 and Iw2 of the windings C2, the primary current frequency command, and the output current (or voltage) value of the inverter 56. The controller 82 estimates or determines radial displacement of the rotor 50 from the currents Iu2, Iv2 and Iw2, etc., amplifies it with a PID. PIDD or another amplifier, and generates command values Fα and Fβ for the radial force acting on the rotor 50 so that the displacement is zero.

The controller 82 is connected to the modulator 84, which modulates the command values Fα and Fβ in accordance with the angle of the rotating field, on the basis of the signals from the sine wave oscillator 52 and cosine wave oscillator 53 of a motor drive (circuitry) section A. The modulated command values are supplied to the two-phase/three-phase converter 86 as two-pole winding voltage command values vα and vβ, which command the voltages of the position control windings C2. The converter 86 converts the values vα and vβ on two-phase axes into voltage command values vu2, vv2 and vw2 on three-phase axes, which are then supplied to the voltage control inverter 88. If the windings were two-phase, the converter 86 could be omitted, so that the voltage command values vα and vβ from the modulator 84 might be directly supplied to the inverter 88.

The voltage control inverter 88 generates output voltages Vu2, Vv2 and Vw2 depending on the voltage command values vu2, vv2 and vw2, respectively. The output voltages are applied to the position control windings C2.

The setup of the motor drive section A is similar to that shown in FIG. 9.

The operation of the embodiment thus set up is explained below.

First explanation is made of the theory of estimating in the controller 82 displacement of the rotor 50 from the currents Iu2, Iv2 and Iw2 of the position control windings C2, the primary current frequency command, and the output current (or voltage) value from the inverter 56. To simplify the explanation, the following explanation is made of a case where the motor windings and position control windings on the stator are two-phase four-pole motor windings Na and Nb and two-phase two-pole position control windings Nα and Nβ, respectively.

Figure 2:
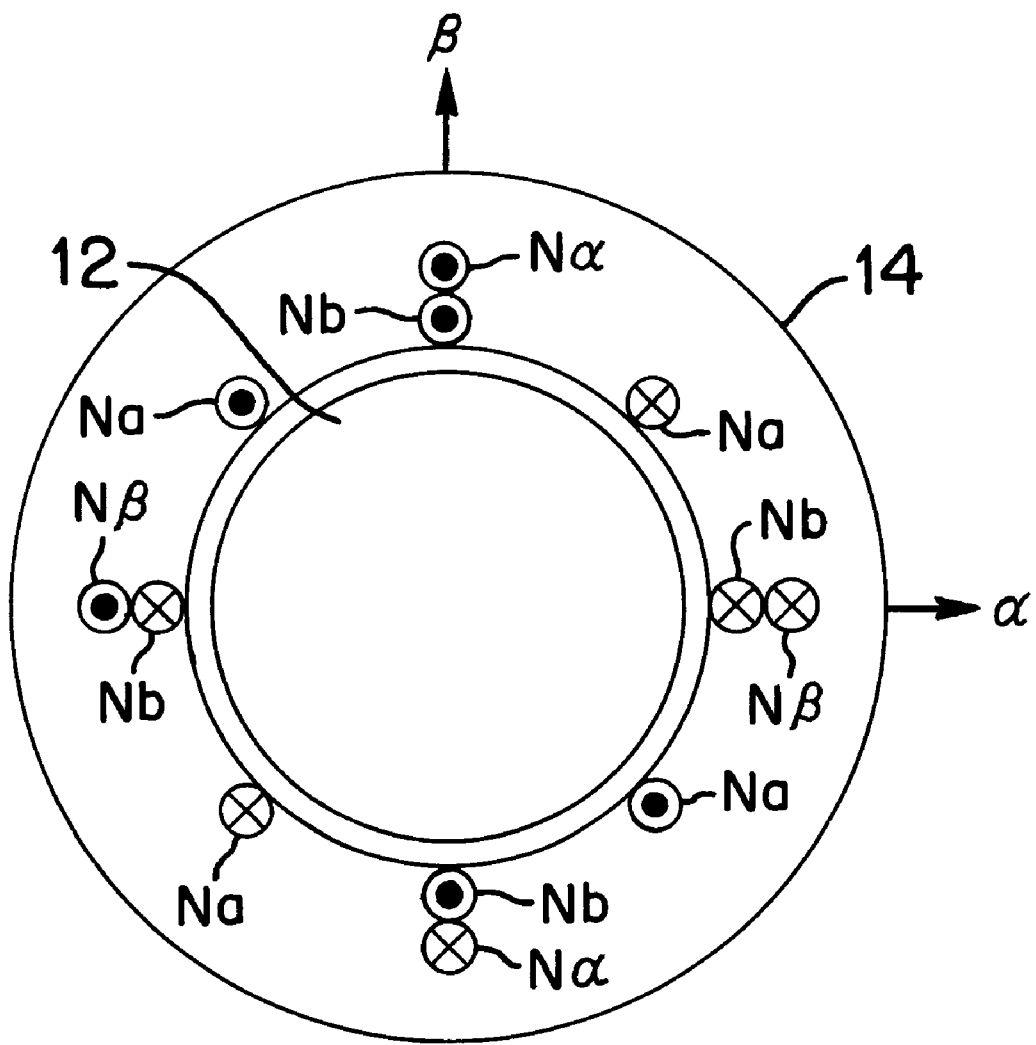
FIG. 2 is a cross section showing an electromagnetic rotating machine.
Figure 3A:
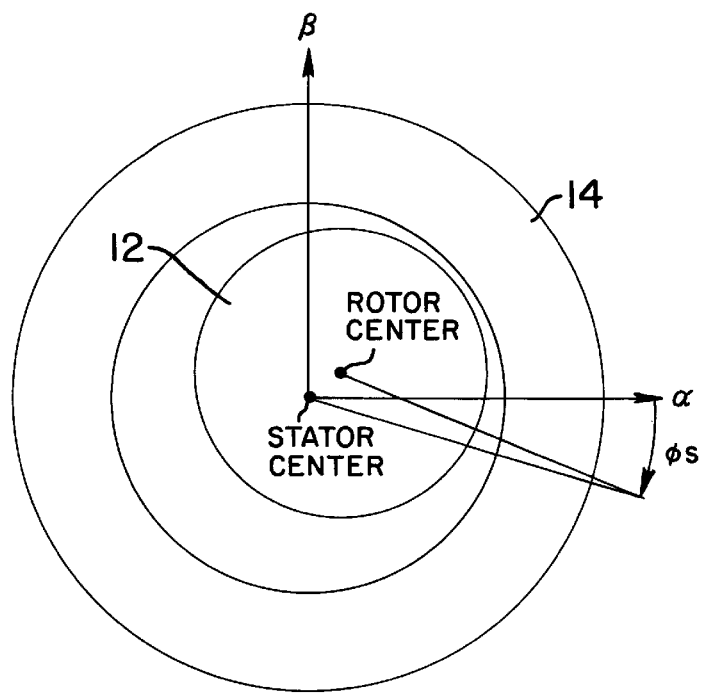
FIGS. 3(a) and 3(b) show displacement of a rotor on coordinate axes.
Figure 3B:
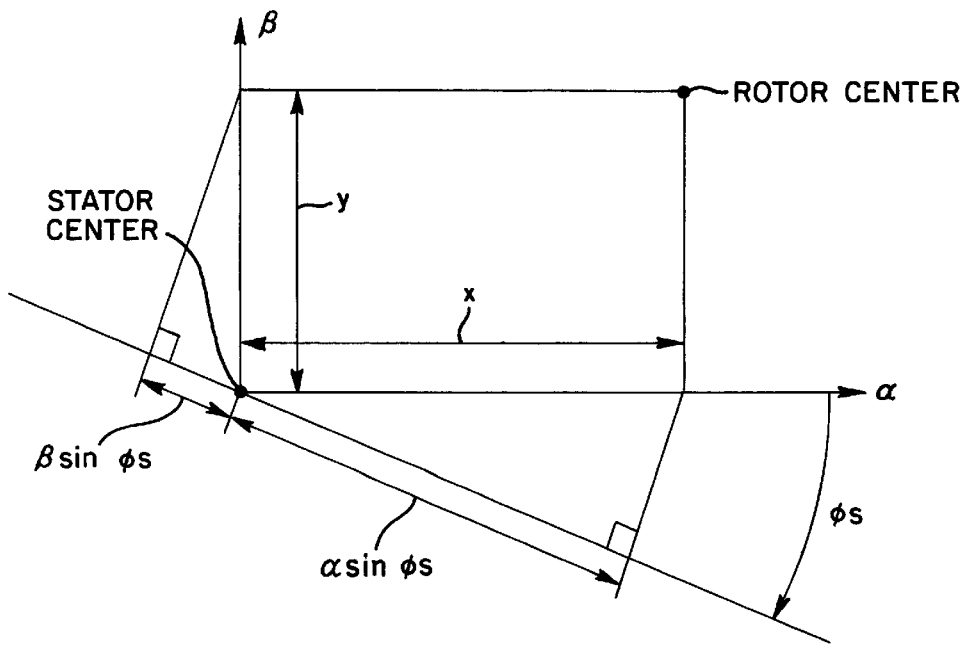

FIG. 2 schematically shows the electromagnetic rotating machine in cross section. FIGS. 3(a) and 3(b) represent displacement of the rotor 12 on coordinate axes. In each of FIGS. 3(a) and 3(b), the axes of abscissa and ordinate are referred to as α-axis and β-axis, respectively. g0 represents the gap when the rotor 12 is position coaxially with the stator 14. It is assumed that the magnetomotive force distribution of the windings Na, Nb, Nα and Nβ is sinusoidal, that magnetic saturation and space harmonics of a slot etc. are neglected, and that the gap permeance between the stator 14 and rotor 12 when the rotor is positioned coaxially with the stator is a constant value.

On such assumptions, the magnetomotive forces of the windings Na, Nb, Nα and Nβ per unit current are represented by the following equations (1)–(4).

$$Aa = -N_4 \cos(2\phi s) \quad (1)$$

$$Ab = -N_4 \sin(2\phi s) \quad (2)$$

$$A\alpha = N_2 \cos(\phi s) \quad (3)$$

$$A\beta = -N_2 \sin(\phi s) \quad (4)$$

In these equations, Aa and Ab represent the magnetomotive forces of the two-phase four-pole motor windings Na and Nb, respectively, while Aα and Aβ represent the magnetomotive forces of the two-phase two-pole position control windings N α and N β, respectively. N4 and N2 represent the fundamental waves of the magnetomotive forces per unit current of the four-pole and two-pole windings, respectively. φs represents the angle along the inner surface of the stator.

It is assumed, as shown in FIGS. 8(a) and 8(b), that the rotor 12 is displaced in the stator 14 by a distance x along the α-axis and a distance y along the β-axis, that the air-gap is sufficiently small in comparison with the radius of the rotor, and that the displacement of the rotor is sufficiently small in comparison with the air-gap. Then, the permeance P0 per unit radian is represented by the following equation (5).

$$P_0 = (\mu_0 R 1/g_0)[1 + (x/g_0)\cos(\phi s) - (y/g_0)\sin(\phi s)] \quad (5)$$

In this equation, R represents the radius of the rotor 12. I represents the axial length of the core. μ0 represents the magnetic permeability in the air. The magnetic fluxes Ψa, Ψb, Ψα and Ψβ when the windings Na, Nb, Nα and Nβ are excited with a unit current are found from the permeance and magnetic potential by the following equations (6)–(9).

$$\Psi a = P_0(Aa/2) \quad (6)$$

$$\Psi b = P_0(Ab/2) \quad (7)$$

$$\Psi\alpha = P_0(A\alpha/2 - N_2 \cdot x/4g_0) \quad (8)$$

$$\Psi\beta = P_0(A\beta/2 - N_3 \cdot y/4g_0) \quad (9)$$

If the flux linkages at the windings Na, Nb, Nα and Nβ are λa, λb, λα and λβ, respectively, in number, while the momentary currents in the windings Na, Nb, Nα and Nβ are ia, ib, iα and iβ, respectively, the following matrix equation (10) can be defined in consideration of the symmetry of inductance.

$$\begin{vmatrix} \lambda a \\ \lambda b \\ \lambda \alpha \\ \lambda \beta \end{vmatrix} = \begin{vmatrix} La & Mab & Ma\alpha & Ma\beta \\ Mab & Lb & Mb\alpha & Mb\beta \\ Ma\alpha & Mb\alpha & L\alpha & M\alpha\beta \\ Ma\beta & Mb\beta & M\alpha\beta & L\beta \end{vmatrix} \begin{vmatrix} ia \\ ib \\ i\alpha \\ i\beta \end{vmatrix} \quad (10)$$

These inductances can be found by integrating the magnetic flux distribution derived in(6–9). For example. the self-inductance La of the a-phase four-pole motor winding is expressed by the following equation (11).

$$La = (\tfrac{1}{2}) \cdot \int \Psi a \cdot Aa d\phi s = \mu_0 \pi 1 R N_4^2 / 4g_0 \quad (11)$$

The mutual inductance Maa between the a-phase four-pole motor winding and α-phase two-pole position control winding is expressed by the following equation (12).

$$Ma\alpha = (\tfrac{1}{2}) \cdot \int \Psi a \cdot Aa d\phi s = (\mu_0 \pi 1 R N_2 \, N/g_0)(-x) \quad (12)$$

The integration of ∫d φs ranges between 0 and 2π. Next, likewise, if the equation (10) is solved with respect to the respective inductances, the solutions are expressed by the following determinants (13)–(15).

$$\begin{vmatrix} La & Mab \\ Mab & Lb \end{vmatrix} = \mu_0 \pi 1 R N_4^2 / 4g_0 \begin{vmatrix} 1 & 0 \\ 0 & 1 \end{vmatrix} \quad (13)$$

$$\begin{vmatrix} L\alpha & M\alpha\beta \\ M\alpha\beta & L\beta \end{vmatrix} = \mu_0 \pi 1 R N_2^2 / 4g_0 \begin{vmatrix} 1 & 0 \\ 0 & 1 \end{vmatrix} \quad (14)$$

$$\begin{vmatrix} Ma\alpha & Mb\alpha \\ Ma\beta & Mb\beta \end{vmatrix} = \mu_0 \pi 1 R N_2 N_4 / 8g_0 \begin{vmatrix} -x & y \\ y & x \end{vmatrix} \quad (15)$$

Therefore, the equations (13) and (14) show that the self-inductances La, Lb, Lα and Lβ of the respective windings do not depend on the displacement of the rotor 12, but are constant. They also show that the mutual inductance Mab between the four-pole motor windings Na and Nb and the mutual inductance Mαβ between the two-pole position control windings Nα and Nβ are zero. In addition, the equation (15) shows that the mutual inductances Ma α, Mbα, Maβ and Mb β of the four-pole motor windings Na and Nb and the position control windings Nα and Nβ, respectively, are proportional to the displacement of the rotor 12.

Figure 4A:
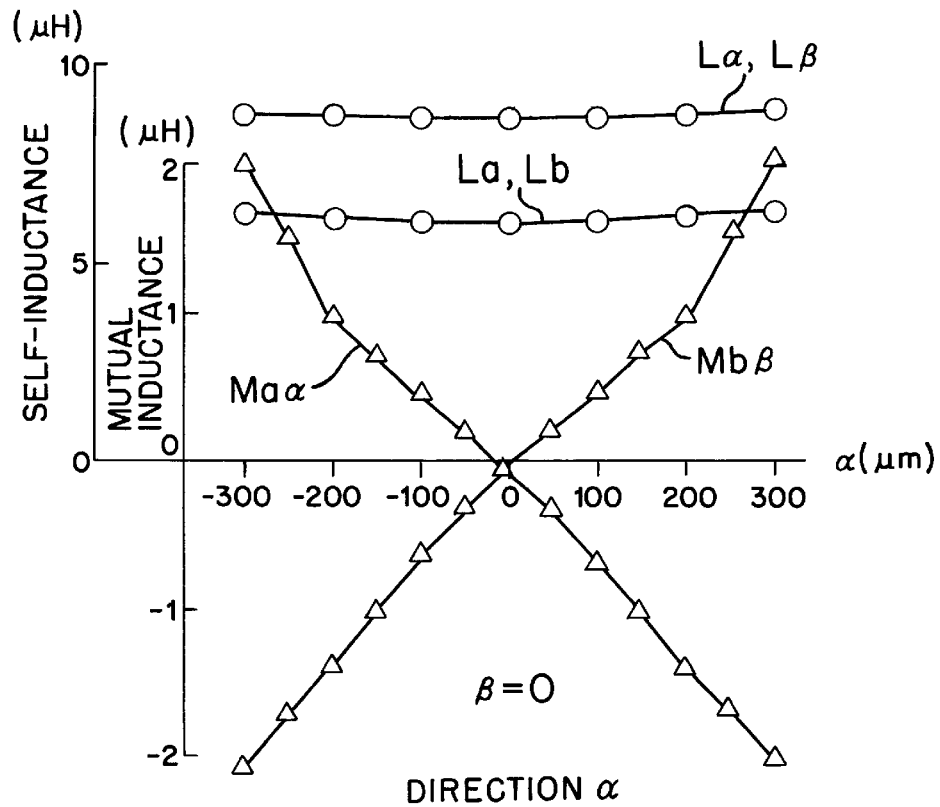
FIGS. 4(a) and 4(b) show results of inductance measurement with an actual apparatus.
Figure 4B:
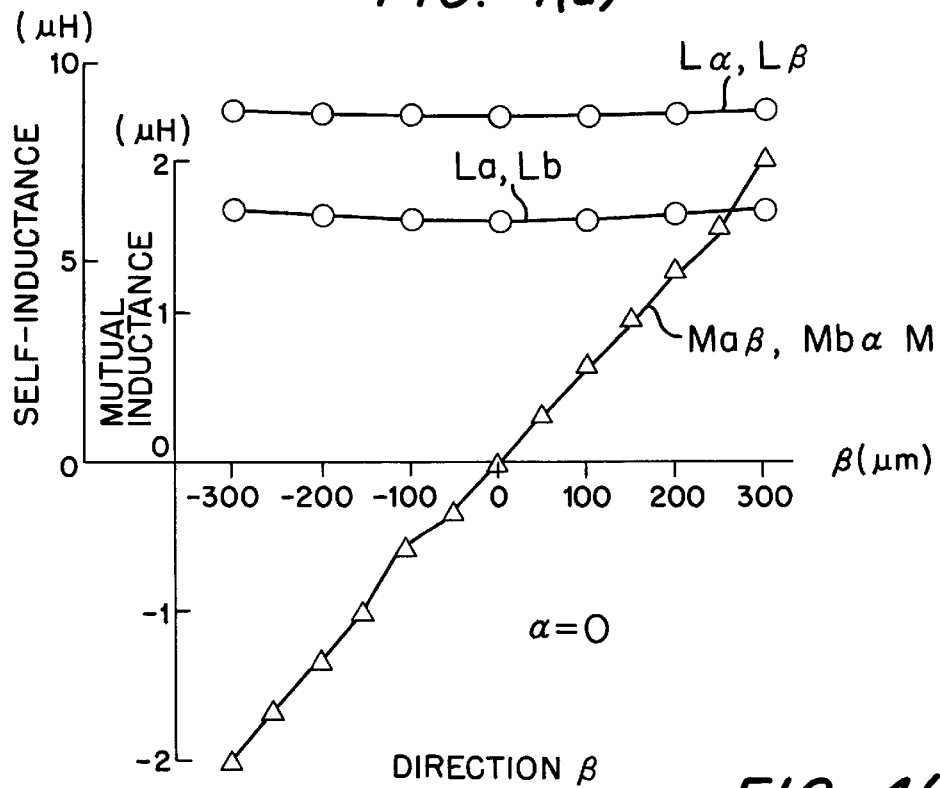

FIGS. 4(a) and 4(b) show the results of measurement of the inductances with an actual apparatus.

If the rotor 12 is displaced in the direction $\alpha$ in FIG. 3(*a*), the mutual inductance Mb$\beta$ is proportional to the displacement, as shown in FIG. 4(*a*), while the mutual inductance Ma $\alpha$ is inversely proportional to the displacement. The mutual inductance Ma $\beta$ and Mb$\alpha$ are zero. If the rotor 12 is displaced in the direction $\beta$ in FIG. 3(*a*), the mutual inductances Ma $\beta$ and Mb $\alpha$ are proportional to the displacement, as shown in FIG. 4(*b*), although Ma$\alpha$ and Mb$\beta$ are zero.

When the rotor 12 is displaced in any direction, the variations in mutual inductances Mab, M $\alpha\beta$, Mb$\alpha$ and Ma $\beta$ are significant in comparison with the other inductances, and near to zero. When the rotor 12 is displaced in any of the directions $\alpha$ and $\beta$, the self-inductances La, Lb, L$\alpha$ and L$\beta$ are nearly constant values.

Therefore, these results support or prove the equations (13)–(15).

The above shows that displacement of the rotor 12 can be estimated from the mutual inductance matrix M42 without providing displacement sensors.

Specifically, if the rotor 12 is positioned coaxially with the stator 14, M42 is zero, so that no electromotive force is induced in the two-pole position control windings N $\alpha$ and N$\beta$. If the rotor 12 is radially displaced, however, M42 is not zero, so that voltages are induced due to the rotating magnetic field of the four-pole motor windings Na and Nb. Since M42 is proportional to the displacement of the rotor 12, as stated above, the induced voltages are proportional to the rotor displacement and the magnitude and speed of the rotating field of the motor windings Na and Nb. This shows that the terminal voltages of the position control windings N $\alpha$ and N$\beta$ contain components in proportion to the radial displacement of the rotor 12.

It is therefore possible to estimate displacement of the rotor 12 by detecting the induced voltages or the currents in the position control windings N $\alpha$ and N$\beta$, and calculating or computing from the detected values and the magnitude and speed of the rotating field of the motor windings Na and Nb. If the magnitude of the rotating field is fixed, it is possible to estimate the displacement by calculating from the induced voltages or the currents in the position control windings N $\alpha$ and N $\beta$ and the speed of the rotating field.

It is also possible to detect PWM carrier frequency component, i.e., seven space voltage vectors including zero vector in the case of three-phase windings. If the motor voltage vectors are detected, or motor voltage vector commands are detected, it is possible to establish rotor radial displacements detecting induced voltage vectors in position control windings.

It is very possible that current source inverters or current controlled voltage source inverters can be employed. The PWM carriers in the above paragraph can be replaced by high frequency signals injected by external signal generator.

The above is explanation of the two-phase four-pole motor windings Na and Nb and two-phase two-pole position control windings N$\alpha$ and N$\beta$. It is also possible to detect, in accordance with a similar principle, the rotor position for two-phase two-pole motor windings and two-phase four-pole position control windings, and even for three-phase windings as is the case with this embodiment.

The operation of the electromagnetic rotating machine 10 is explained below.

Figure 8:
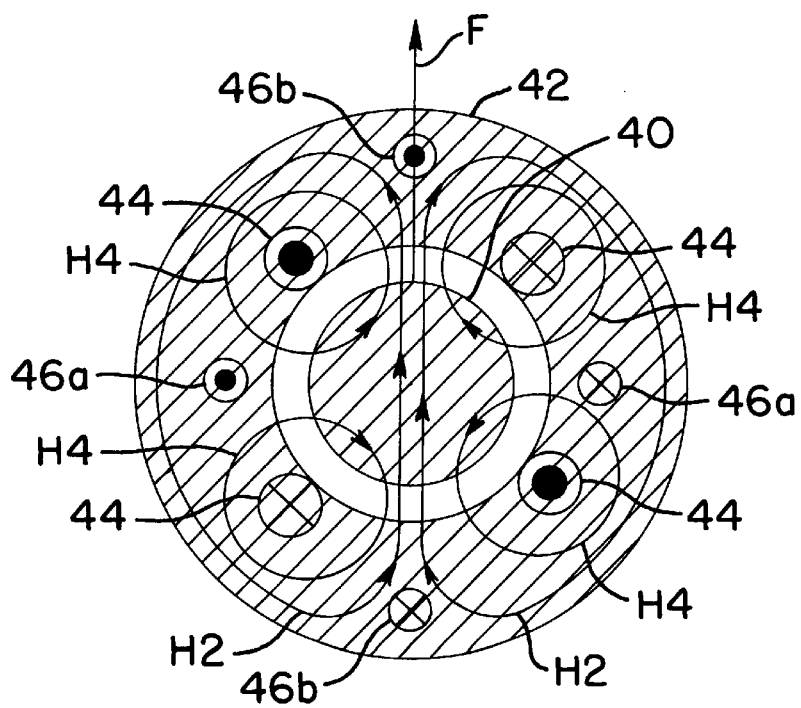
FIG. 8 is a cross section showing the principle of generation of radial force in the electromagnetic rotating machine.

In this embodiment, the inverter 56 of the motor drive section A makes three-phase symmetric currents flow in the motor windings C4, so that a rotating magnetic field is generated on the stator side. In addition, as shown in FIG. 8, the position control windings C2 positively unbalance the magnetic flux density, so that radial force acts on the rotor 50 to magnetically float or levitate it. The voltage control of the windings C2 by the position control section B1 controls the floating position so that the rotor floats in position (stator center). Thus, the rotor 50 is driven for non-contact rotation.

In the position control of the rotor 50, if the rotor is positioned coaxially with the stator, the mutual inductance matrix M (equivalent or corresponding to M42) between the motor windings C4 and position control windings C2 is zero, in accordance with the above principle, so that the windings C4 induce no electromotive force in the windings C2.

If the rotor 50 is radially displaced, the mutual inductance matrix M is not zero, so that electromotive forces are induced in the position control windings C2 due to the rotating magnetic field of the motor windings C4.

The mutual inductance matrix M is proportional to the displacement of the rotor 50, in accordance with the above principle. Therefore, the induced voltages are proportional to the displacement of the rotor 50 and the speed and magnitude of the rotating magnetic field of the motor windings C4. That is to say, the terminal voltages of the position control windings C2 contain components in proportion to the radial displacement of the rotor 50.

The controller 82 is supplied with the currents Iu2, Iv2 and Iw2 of the position control windings C2. The controller 82 estimates displacement of the rotor 50 by calculating from these currents, the primary current frequency command 2 $\omega$, which is the speed of the rotating magnetic field, and the output current (or voltage) value from the inverter 56 for estimating the magnitude of the rotating field. The controller 82 then compares the estimated displacement with gap command values (not shown), and generates command values F$\alpha$ and F$\beta$ for commanding the force in the direction which makes the gap errors zero. Voltages are then applied through the modulator 84, two-phase/three-phase converter 86 and voltage control inverter 88 to the position control windings C2. The position of the rotor 50 is controlled so that the currents based on the rotor displacement are specified values.

It is also possible to estimate rotor radial positions from carrier frequency components. Since the voltage source inveter generates PWM carrier frequency components, there exist PWM frequency components at the radial position control windings. Detecting the voltage vectors, i.e., instantaneous voltage, rotor radial displacements can be estimated, because these induced voltages are generated by mutual inductances between the motor windings and the radial position control windings, and are functions of the rotor radial displacement.

As described above, in the electromagnetic rotating machine 10 of this embodiment, the position of the rotor 50 is controlled without providing displacement sensors. It is therefore possible to reduce the number of wires and raise the reliability. In addition, because of no displacement sensors are used, the costs can be low. Furthermore, collocation cannot occur, which would be a problem with an elastic rotor.

The second embodiment is described below.

Figure 5:
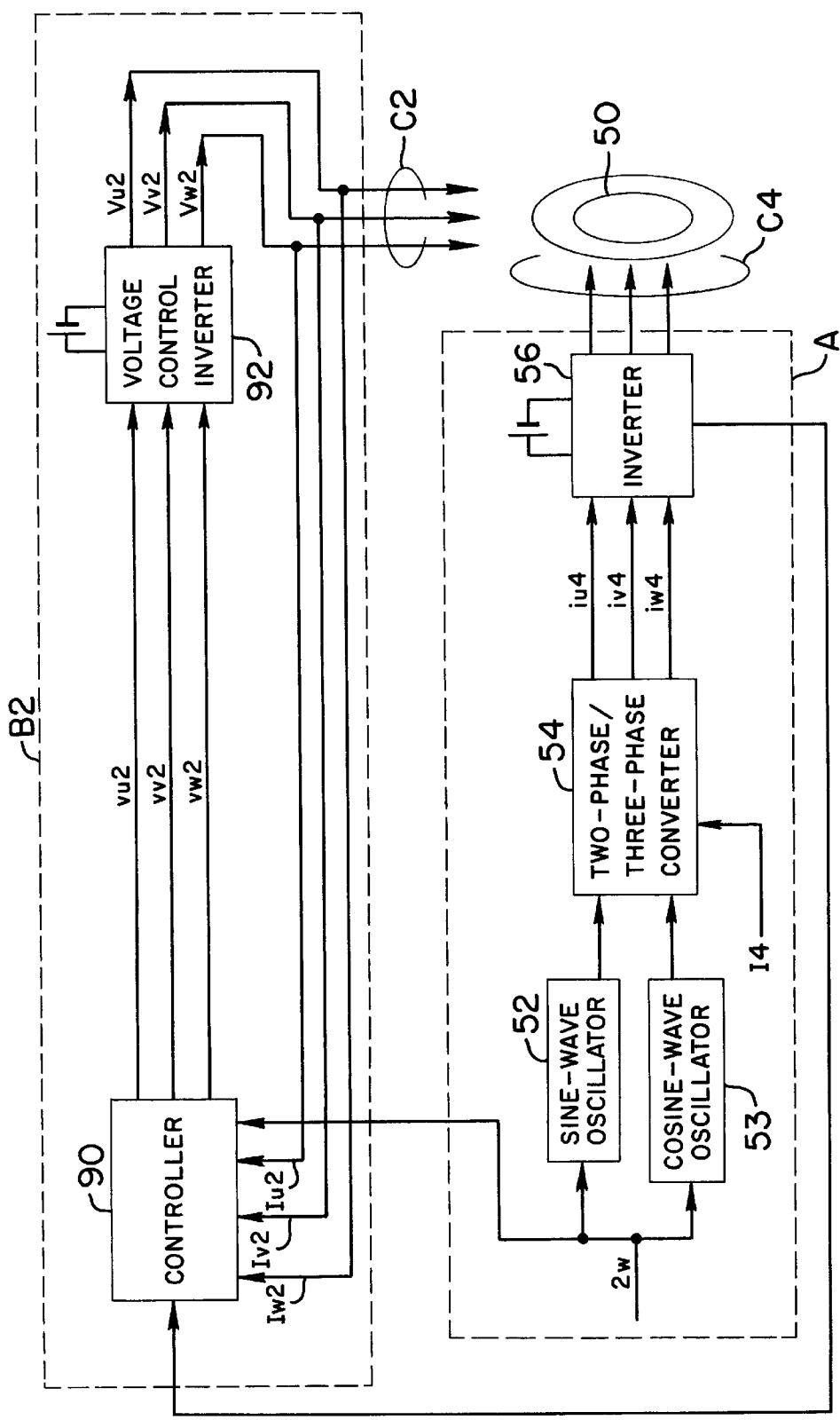
FIG. 5 is a block diagram showing the main portion of the control system of an electromagnetic rotating machine according to the second embodiment.

FIG. 5 shows the main portion in the control system of the electromagnetic rotating machine according to the second embodiment. In FIG. 5, setups and/or parts which are similar to those of the first embodiment are indicated by the same numerals, and are not described in detail.

In this embodiment, the control system is more simplification that in the first embodiment. The controller 90 of the position control section B2 is set up with a transfer function for stabilizing the radial system.

Specifically, the controller 90 reconfigures or reconstructs the transfer function for stabilizing the radial system, by having the function of estimating the displacement by receiving the currents Iu2, Iv2 and Iw2(or voltage) of the position control windings C2 and calculating from these currents, the primary current frequency command 2 ω, which is the speed of the rotating magnetic field, and the output voltage (or current) from the inverter 56 for estimating the magnitude of the rotating filed, and the functions, explained in the first embodiment, of the circuit for generating the command values F α and F β, the modulator 84 and the two-phase/three-phase converter 86.

Consequently, the controller 90 detects the currents Iu2, Iv2 and Iw2 (or voltage vu2,vv2,vw2)of the position control windings C2 as inputs, calculates the voltage (or current) command values for stabilizing the radial system, and outputs the values vu2, vv2 and vw2 (or current iu2,iv2,iw2)to the voltage control inverter 92. On the basis of these signals, the inverter 92 outputs voltages Vu2, Vv2 and Vw2 (or regulate currents iu2, iv2, iw2) to the windings C2 to control the position of the rotor 50.

In these two embodiments, the radial position of the rotor 50 is estimated from the currents of the position control windings C2. Otherwise, the rotor position may be controlled by estimating the radial position of the rotor 50 from the induced voltages of the windings C2, calculating the current command values for stabilizing the radial system, and outputting the values from an inverter.

It is also possible to control instantaneous reactive power and active power to find out the method of stabilization. In this case, the inverter 92 can be seen as active power filter which generates a negative self-inductance as well as negative resistance, i.e., close to Lα and Lβ and these winding resistance. The inverter 92 also provides control to levitate the rotor. The active power filter,i.e., active damping generator in radial rotor position control, can be accompanied with passive inductance circuits, capacitance and resistance. These circuits need no information from motor drive inverter, thus can be installed in bearingless motor units.

The third embodiment is described below. Setups and/or parts which are similar to those of the first embodiment are indicated by the same numerals, and are not described in detail.

In this embodiment, the stator (not shown) has four-pole motor windings C4 and two-pole position control windings C2. The windings C4 are connected with a motor drive section A for controlling their drive currents.

In this embodiment, the position control windings C2 form a closed circuit by shorting their terminals. The voltage induced in the closed circuit when the motor is driven causes radial force which keeps the rotor 50 always coaxial with the stator.

Specifically, as stated above, voltages are induced in the position control windings C2 in proportion to the displacement of the rotor 50 and the magnitude and speed of the rotating magnetic field of the motor windings C4. Therefore, as is the case with this embodiment, by shorting the terminals of the windings C2 to form a closed circuit, voltage is induced in the closed circuit in such a direction so as to cancel the rotor displacement. The induced voltage makes current flow which generates radial force for keeping the rotor 60 always coaxial with the stator, so that the rotor position is controlled.

If the position control windings C2 have winding resistance, however, the radial force is not very large when the induced voltages are low. Nevertheless, if the rotating speed and the induced voltages of the windings C2 increase, the current increases. As a result, large radial force is generated, so that it is possible to realize the control for always keeping the rotor 50 coaxial with the stator.

If the position control windings C2 consist of superconductors and/or low resistors, the winding resistance is nearly zero, so that even low induced voltage can make large current flow. It is therefore possible to realize the control for always keeping the rotor 50 coaxial with the stator.

Figure 6:
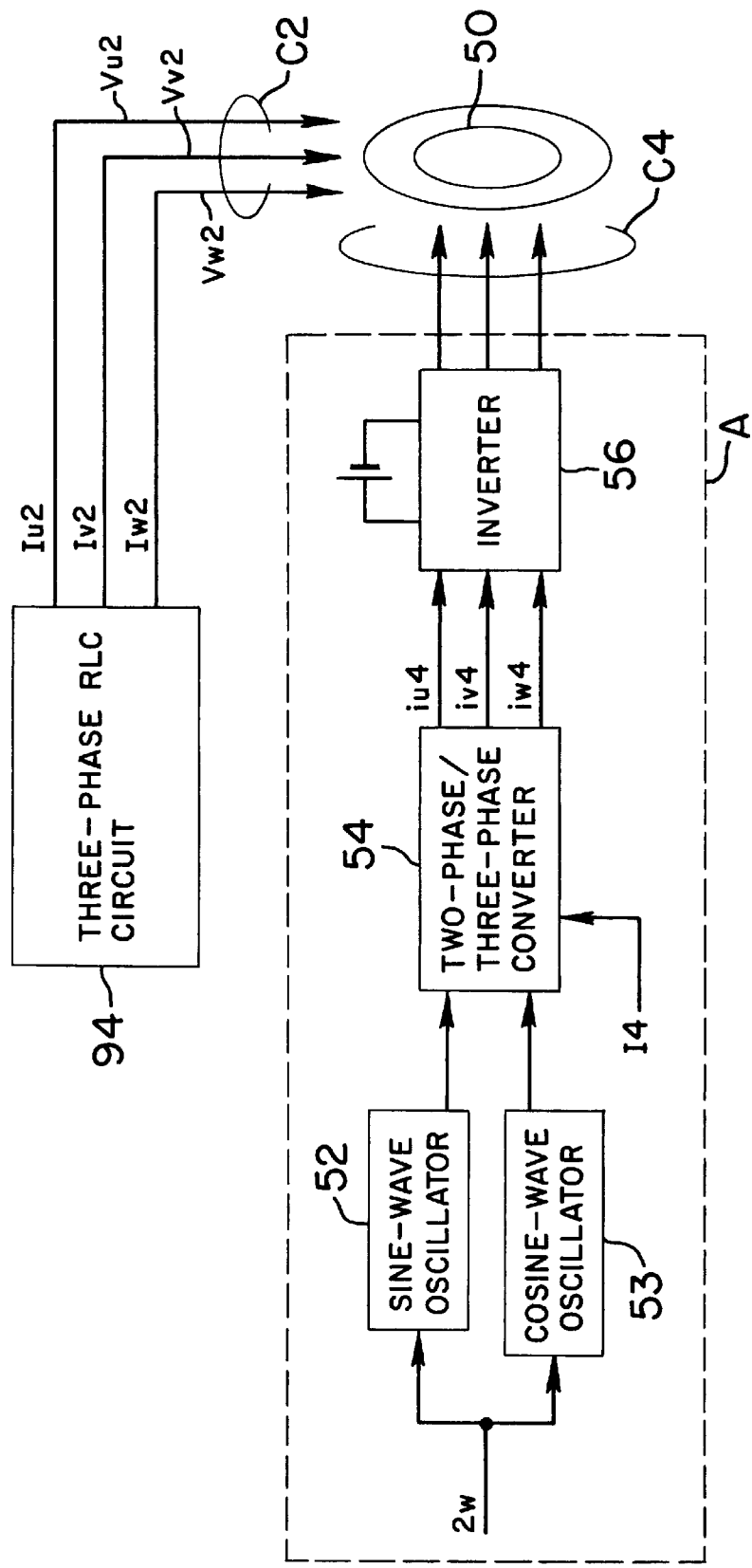
FIG. 6 is a block diagram showing an example of the control system of an electromagnetic rotating machine according to the third embodiment.
Figure 7:
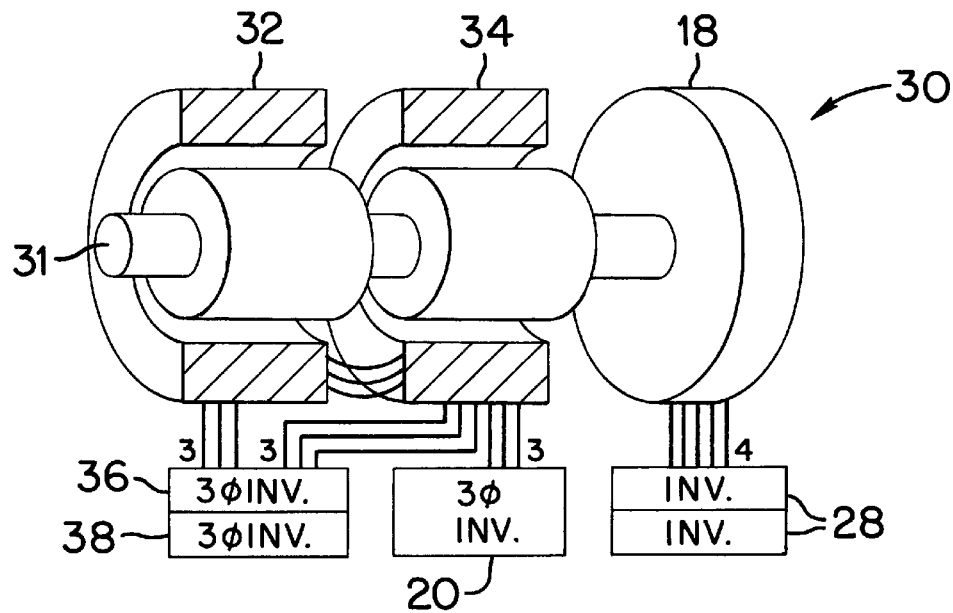
FIG. 7 is a perspective view partially in cross section showing an electromagnetic rotating machine with position control windings.

By providing the position control windings C2 with an RLC circuit 94 as shown in FIG. 6, it is possible to reduce the damping at low frequencies with the capacitor C and the damping at high frequencies with the inductor L. In other words, it is possible to determine the speed at which the rotor starts floating in a low speed range, and to keep the position control current from being too large when the induced voltage is high in a high speed range.

In this method, as compared with the first and second embodiments, the setup can be simple and the costs can be low, since it is possible to omit the controller, the inverter, the current detector, etc. for position control.

In each of the embodiments, the motor windings C4 and position control windings C2 are four-pole and two-pole windings, respectively. Contrariwise, the windings C4 and C2 may be two-pole and four-pole, respectively.

Each of the embodiments is exemplified by an electromagnetic rotating machine driven as a motor. Otherwise, the present invention may be applied to an electromagnetic rotating machine driven as a generator as well.

What is claimed is:

1. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in one or more of the position control windings in response to radial displacement of the rotor and the rotating magnetic field generated by the one or more drive windings; radial displacement detection means for detecting the radial displacement of the rotor based on the induced voltage or the induced current detected by the induced state detection means and the magnitude and speed of the rotating magnetic field generated by the one or more drive windings; and position control means for controlling the radial position of the rotor by changing the magnetic force generated by the magnetic force generation means in accordance with the radial displacement detected by the radial displacement detection means.

2. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; electromotive force generation means for generating one of a voltage or a current which is effective to cancel an induced voltage or an induced current generated in the one or more position control windings in response to radial displacement of the rotor and the rotating magnetic field generated by the one or more drive windings; and position control means for controlling the radial position of the rotor by changing the magnetic force generated by the magnetic force generation means in accordance with the voltage or current generated by the electromotive force generation means.

3. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; an impedance circuit for determining the relation between an induced voltage and a current which are generated in the one or more position control windings in response to radial displacement of the rotor and the rotating magnetic field generated by the one or more drive windings; and position control means for controlling the radial position of the rotor by changing the magnetic force generated by the magnetic force generation means in accordance with the relation between the voltage and current which is determined by the impedance circuit.

4. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in one or more of the position control windings in response to radial displacement of the rotor and PWM vectors generated by the one or more drive windings; radial displacement detection means for detecting the radial displacement of the rotor based on the induced voltage or the induced current detected by the induced state detection means and space vectors of motor applied voltage generated by the one or more drive windings; and position control means for controlling the radial position of the rotor by changing the magnetic force generated by the magnetic force generation means in accordance with the radial displacement detected by the radial displacement detection means.

5. An electromagnetic rotating machine driven by an electromagnetic action between a stator and a rotor, the machine comprising: one or more drive windings fitted to the stator for generating a rotating magnetic field for rotatably driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in one or more of the position control windings in response to radial displacement of the rotor and the injected high frequency carrier generated by the one or more drive windings; radial displacement detection means for detecting the radial displacement of the rotor based on the induced voltage or the induced current detected by the induced state detection means and the injected high frequency carrier generated by the one or more drive windings; and position control means for controlling the radial position of the rotor by changing the magnetic force generated by the magnetic force generation means in accordance with the radial displacement detected by the radial displacement detection means.

6. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in one or more of the drive windings in response to radial displacement of the rotor and PWM voltage space vectors generated by the one or more drive windings; radial displacement detection means for detecting the radial displacement of the rotor based on the induced voltage or the induced current detected by the induced state detection means and the PWM voltage space vectors of motor applied voltage generated by the one or more drive windings; and position control means for controlling the radial position of the rotor by changing the magnetic force generated by the magnetic force generation means in accordance with the radial displacement detected by the radial displacement detection means.

7. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in one or more of the position control windings in response to radial displacement of the rotor and PWM voltage space vectors generated by the one or more position control windings; radial displacement detection means for detecting the radial displacement of the rotor based on the induced voltage or the induced current detected by the induced state detection means and PWM voltage space vectors of motor applied voltage generated by the one or more position control windings; and position control means for controlling the radial position of the rotor by changing the magnetic force generated by the magnetic force generation means in accordance with the radial displacement detected by the radial displacement detection means.

8. An electromagnetic rotating machine driven by an electromagnetic action between a stator and a rotor, the machine comprising: one or more drive windings fitted to the stator for generating a rotating magnetic force for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting an induced voltage or an induced current generated in one or more of the drive windings in response to radial displacement of the rotor and an injected high frequency carrier generated by one or more of the drive windings; radial displacement detection means for detecting the radial displacement of the rotor based on the induced voltage or the induced current detected by the induced state detection means and the injected high frequency carrier generated by one or more of the drive windings; and position control means for controlling the radial position of the rotor by changing the magnetic force generated by the magnetic force generation means in accordance with the radial displacement detected by the radial displacement detection means.

9. An electromagnetic rotating machine driven by an electromagnetic action between a stator and a rotor, the machine comprising: one or more drive windings fitted to the stator for generating a rotating magnetic field for rotatable driving the rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; induced state detection means for detecting one of an induced voltage and an induced current generated in the position control windings in response to radial displacement of the rotor and an injected high frequency carrier generated by one or more of the position control windings; radial displacement detection means for detecting the radial displacement of the rotor based on the induced voltage or the induced current detected by the induced state detection means and the injected high frequency carrier generated by one or more of the position control windings; and position control means for controlling the radial position of the rotor by changing the magnetic force generated by the magnetic force generation means in accordance with the radial displacement detected by the radial displacement detection means.

10. An electromagnetic rotating machine driven by an electromagnetic action between a stator and a rotor, the machine comprising: one or more drive windings fitted to the stator for generating a rotating magnetic field for rotatable driving a rotor; one or more position control windings fitted to the stator for generating a magnetic field having a different number of poles than that of the one or more drive windings; magnetic force generation means for generating a magnetic force to act on the rotor by supplying one or more of the position control windings with an electric current sufficient to unbalance the magnetic field on the stator side so as to levitate the rotor within the stator; an active power filter and passive device circuit for determining the relation between an induced voltage and an induced current which are generated in one or more position control windings in response to radial displacement of the rotor and the rotating magnetic field generated by the one or more drive windings; and position control means for controlling the radial position of the rotor by changing the magnetic force generated by the magnetic force generation means in accordance with the relation between the induced voltage and induced current which is determined by the active power filter and passive device circuit.

11. An electromagnetic rotating machine comprising: a stator defining an opening; a rotor disposed to undergo rotational movement within the opening of the stator in response to a rotational magnetic field and to undergo radial movement within the shaft; one or more drive windings disposed in the stator for generating a rotational magnetic field for rotatably driving the rotor; one or more position control windings disposed in the stator for generating a magnetic field effective to levitate the rotor within the shaft; and means for controlling the radial position of the rotor by generating one of a voltage or current effective to cancel an induced voltage or an induced current in one or more of the position control windings in response to radial displacement of the rotor so as to maintain the rotor at a desired radial position within the shaft without the need for a displacement detector for monitoring the radial position of the rotor.

12. An electromagnetic rotating machine according to claim 11; wherein the magnetic field produced by the one or more position control windings has a different number of poles than that produced by the one or more drive windings.

13. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor, radial displacement determining means for determining the radial displacement of the rotor based on the induced voltage or the induced current detected by the induced state detecting means, and means for changing the magnetic field generated by the one or more position control windings in accordance with the radial displacement determined by the radial displacement determining means.

14. An electromagnetic rotating machine according to claim 11; wherein the means for controlling the radial position of the rotor comprises an impedance circuit for determining the relationship between an induced voltage and an induced current which are generated in one or more of the position control windings in response to radial displacement of the rotor, and means for changing the magnetic field generated by one or more of the position control windings in accordance with the relationship between the induced voltage and the induced current.

15. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor and the rotating magnetic field generated by the one or more drive windings, radial displacement determining means for determining the radial displacement of the rotor based on the induced voltage or the induced current detected by the induced state detecting means, and means for changing the magnetic field generated by the one or more position control windings in accordance with the radial displacement determined by the radial displacement determining means.

16. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor and PWM vectors generated by the one or more drive windings, radial displacement determining means for determining the radial displacement of the rotor based on the induced voltage or the induced current detected by the induced state detecting means and the PWM space vectors generated by one or more of the drive windings, and means for changing the magnetic field generated by the one or more position control windings in accordance with the radial displacement determined by the radial displacement determining means.

17. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor and an injected high frequency carrier generated by the one or more drive windings, radial displacement determining means for determining the radial displacement of the rotor based on the induced voltage or the induced current detected by the induced state detecting means and the injected high frequency carrier generated by the one or more drive windings, and means for changing the magnetic field generated by the one or more position control windings in accordance with the radial displacement determined by the radial displacement determining means.

18. An electromagnetic rotating machine according to claim 11; wherein the means for controlling the radial position of the rotor comprises induced state detecting means for detecting one of an induced voltage and an induced current generated in one or more of the drive windings in response to radial displacement of the rotor and PWM vectors generated by the one or more drive windings, radial displacement determining means for determining the radial displacement of the rotor based on the induced voltage or the induced current detected by the induced state detecting means and the PWM space vectors generated by one or more of the drive windings, and means for changing the magnetic field generated by the one or more position control windings in accordance with the radial displacement determined by the radial displacement determining means.

19. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor and PWM vectors generated by the one or more position control windings, radial displacement determining means for determining the radial displacement of the rotor based on the induced voltage or the induced current detected by the induced state detecting means and the PWM space vectors generated by one or more of the position control windings, and means for changing the magnetic field generated by the one or more position control windings in accordance with the radial displacement determined by the radial displacement determining means.

20. An electromagnetic rotating machine according to claim 11; wherein the means for controlling the radial position of the rotor comprises induced state detecting means for detecting one of an induced voltage and an induced current generated in one or more of the drive windings in response to radial displacement of the rotor and an injected high frequency carrier generated by one or more of the drive windings, radial displacement determining means for determining the radial displacement of the rotor based on the induced voltage or the induced current detected by the induced state detecting means and the injected high frequency carrier generated by one or more of the drive windings, and means for changing the magnetic field generated by the one or more position control windings in accordance with the radial displacement determined by the radial displacement determining means.

21. An electromagnetic rotating machine according to claim 11; wherein the means for controlling the radial position of the rotor comprises induced state detecting means for detecting one of an induced voltage and an induced current generated in one or more of the position control windings in response to radial displacement of the rotor and an injected high frequency carrier generated by one or more of the position control windings, radial displacement determining means for determining the radial displacement of the rotor based on the induced voltage or the induced current detected by the induced state detecting means and the injected high frequency carrier generated by one or more of the position control windings, and means for changing the magnetic field generated by the one or more position control windings in accordance with the radial displacement determined by the radial displacement determining means.

* * * * *